US006152405A

United States Patent [19]
Müller

[11] Patent Number: 6,152,405
[45] Date of Patent: *Nov. 28, 2000

[54] LIFT BODY HAVING A VARIABLE CAMBER

[75] Inventor: Dietmar Müller, Rheinheim, Germany

[73] Assignee: Daimler-Benz Aerospace AG, Munich, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/954,198

[22] Filed: Oct. 20, 1997

[30] Foreign Application Priority Data

Oct. 19, 1996 [DE] Germany .............................. 196 43 222

[51] Int. Cl.[7] ....................................................... B64C 3/44
[52] U.S. Cl. ......................... 244/219; 244/35 R; 244/212
[58] Field of Search .................................. 244/35 R, 219, 244/212, 213, 215

[56] References Cited

U.S. PATENT DOCUMENTS

| 1,755,886 | 4/1930 | McKenzie . |
| 1,823,069 | 9/1931 | Stroop . |
| 1,856,578 | 5/1932 | Miquel et al. . |
| 2,333,482 | 11/1943 | Littman . |
| 3,109,613 | 11/1963 | Bryant ........................................ 244/44 |
| 3,716,209 | 2/1973 | Pierce . |
| 4,113,210 | 9/1978 | Pierce ....................................... 244/219 |
| 4,286,761 | 9/1981 | Musgrove .............................. 244/75 R |
| 4,427,169 | 1/1984 | Brown ..................................... 244/219 |
| 5,367,970 | 11/1994 | Beauchamp et al. . |
| 5,662,294 | 9/1997 | Maclean et al. . |

FOREIGN PATENT DOCUMENTS

| 631 287 | 12/1927 | France . |
| 20 26 054 | 12/1970 | Germany . |
| 28 44 476 | 4/1980 | Germany . |
| 15290 | of 1915 | United Kingdom ................... 244/219 |

Primary Examiner—Peter M. Poon
Assistant Examiner—Tien Dinh
Attorney, Agent, or Firm—Evenson, McKeown, Edwards & Lenahan, P.L.L.C.

[57] ABSTRACT

A lift body has a variable camber to achieve a flow-favorable profile. The lift body has a structure which is elastically deformable at least in one area. An integrated adjusting device includes at least one dimensionally stable adjusting body which can be rotated about an axis and which is in an operative connection with the deformable structure. Each adjusting body has a curved conical shape whose local cross-section corresponds to the local profile thickness. Each adjusting body is in a direct and/or, via a sliding layer, an indirect contact with the deformable structure.

55 Claims, 4 Drawing Sheets

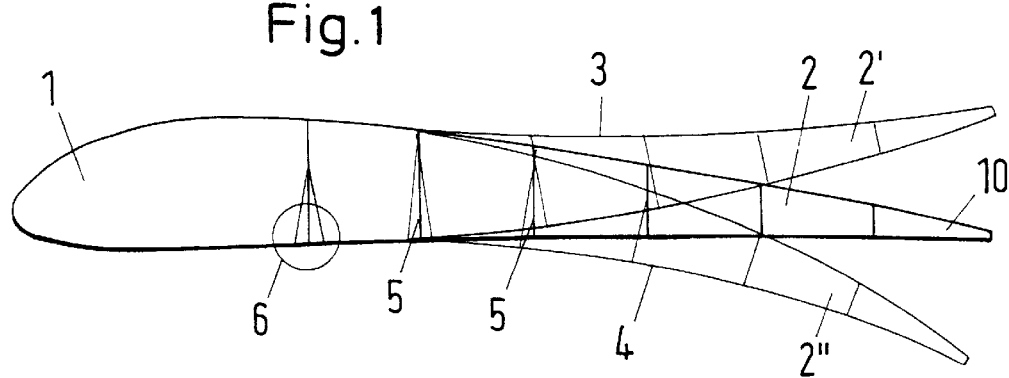
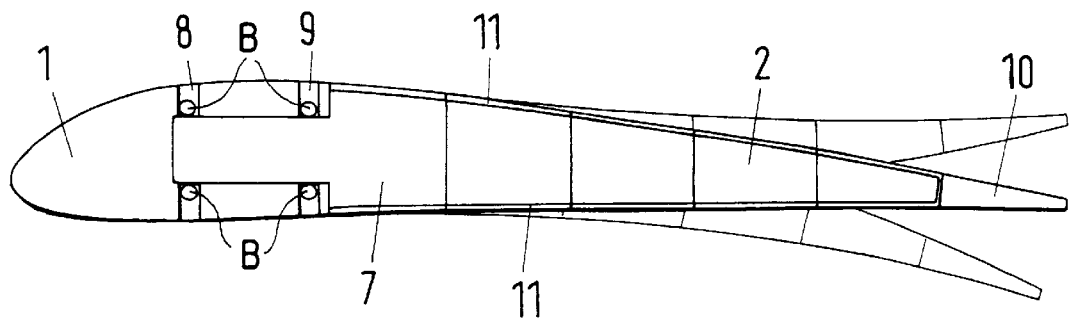
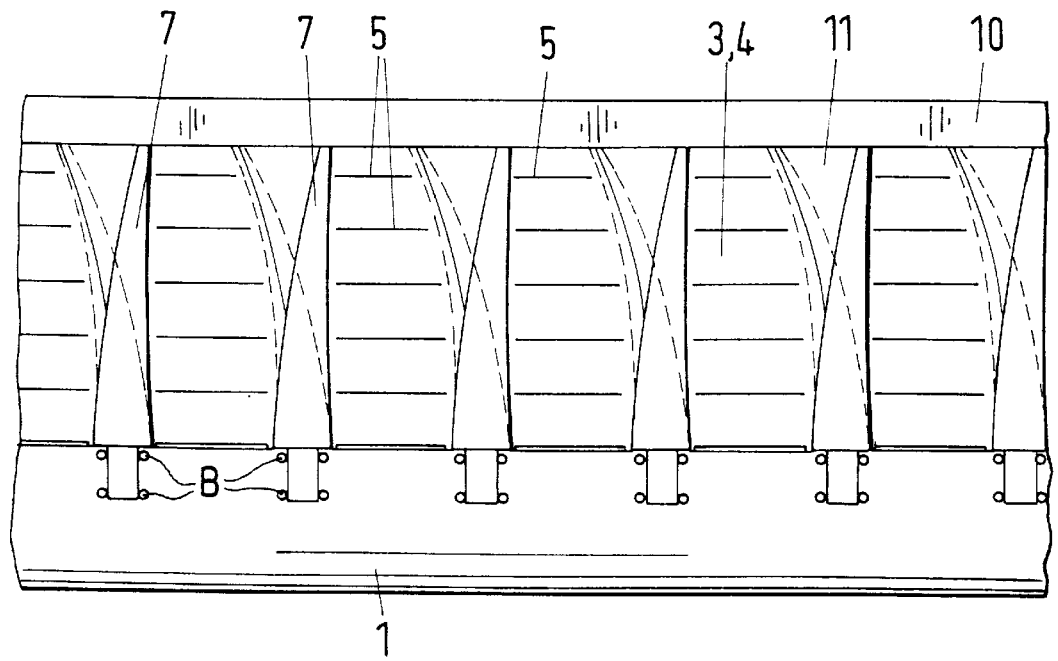

Fig.4
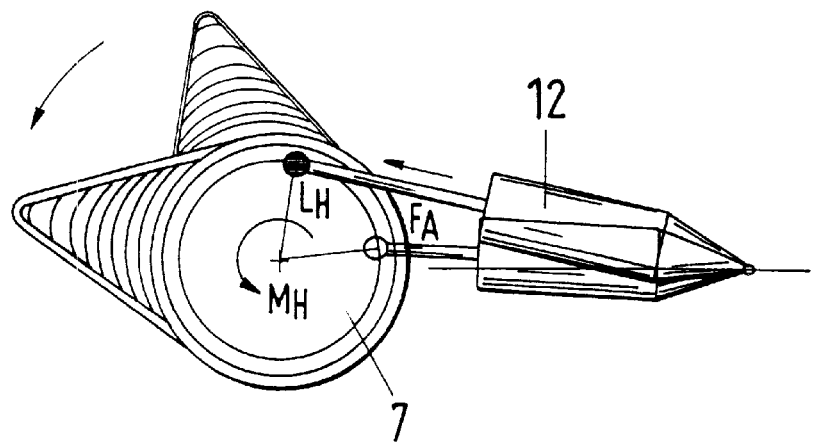
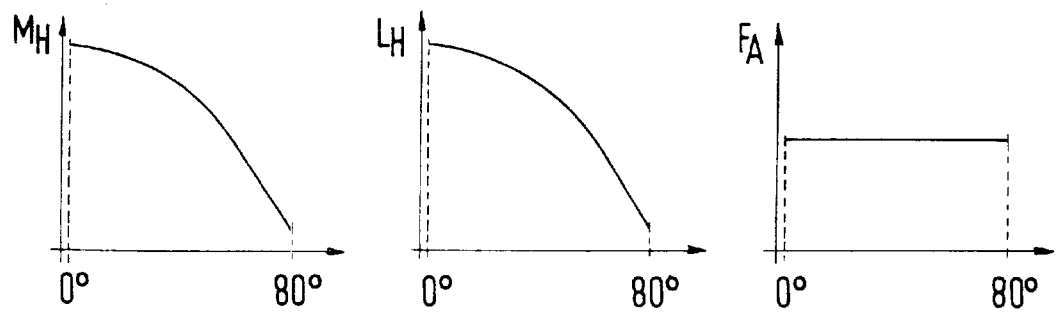

Fig. 5
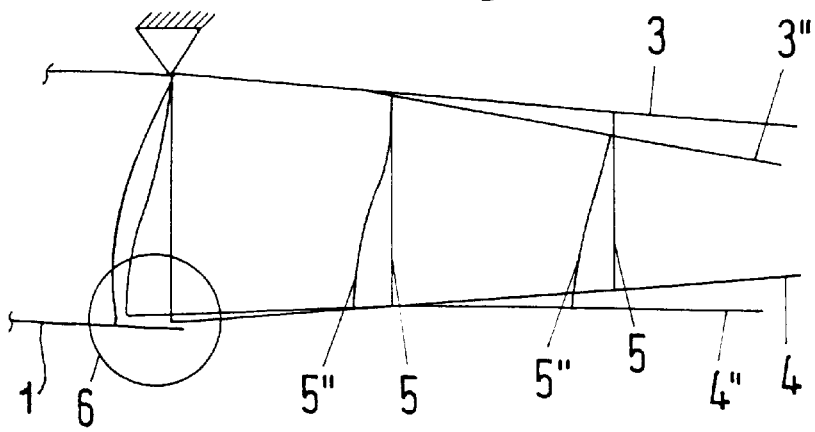
Fig. 6
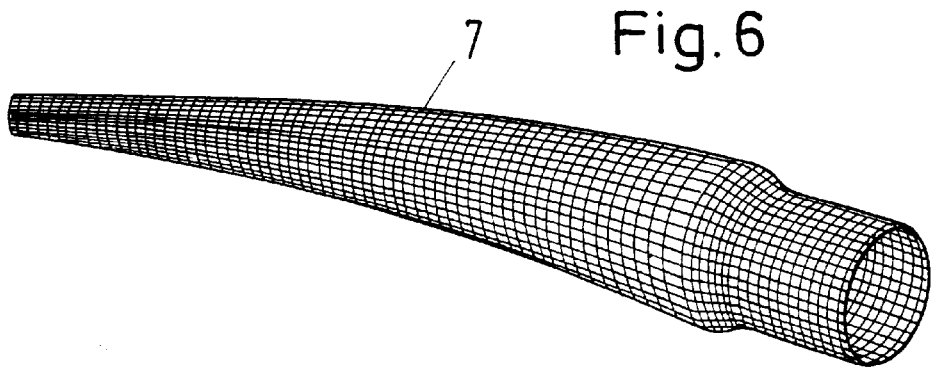
Fig. 7
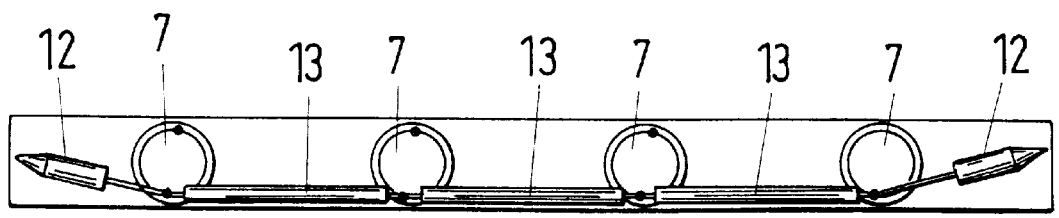
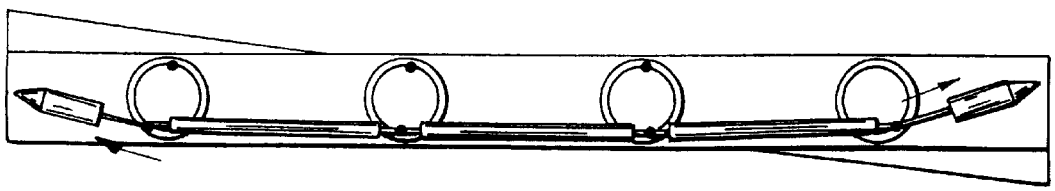

LIFT BODY HAVING A VARIABLE CAMBER

BACKGROUND AND SUMMARY OF THE INVENTION

This application claims the priority of German patent application 196 43 222.7, the disclosure of which is expressly incorporated by reference herein.

The invention relates to a lift body having a variable camber.

In order to adapt the lift and the flow resistance of a body around which a flow takes place to different environmental conditions and to optimize this lift and flow resistance, various arrangements and processes are known. In the case of commercial airplanes, the profile camber is changed, for example, by the kinematic displacement or rotation of separate flaps of the wing.

As a result, gaps and hollow spaces occur in the skin of the airplane wings. The wing body itself does not change its shape in this case.

From U.S. Pat. No. 3,109,613, an arrangement is known in which aerodynamic properties, particularly of lift surfaces of airplanes, can be influenced by a change of the profile shape or of the camber. The changing of the profile shape is achieved by a multisection, crankshaft-type structure in the interior of the airplane wing, in which case, via different bearings, a vertical displacement of webs takes place in the interior of the airplane wing. By means of a piano-hinge-type bearing, the webs are connected in an articulated manner with the suction-side or pressure-side skin of the wing. By the rotation of the shaft, the profile shape is bent piece by piece, whereby a quasi-continuous deformation of the airplane wing structure is achieved.

The described processes and devices have the disadvantage that the joint structures result in very high constructional expenditures, and high actuator forces must be implemented for moving the structures in order to permit a sufficient change of the camber.

Furthermore, the arrangement described in U.S. Pat. No. 3,109,613 is to be implemented with high mechanical expenditures. By means of this arrangement, a high stiffness can be implemented only by a high increase in weight.

In contrast, there is a need for a lift body in which the flow-around characteristics are improved by the continuous deformation of a light, stiff and low-friction adjusting device.

This and other needs have been met according to the present invention by providing lift body having a variable camber, particularly airplane wings, having a fluidically favorable profile which at least at times generates a lift or transverse driving force, having a structure which is for the most part hollow, is elastically deformable at least downstream of the largest profile thickness and has several web-type connections between the suction-side and the pressure-side skin, as well as having an integrated adjusting device comprising one or several dimensionally stable adjusting bodies which can each be rotated about a defined axis and are in a mechanical operating connection with the skin areas to be deformed, characterized in that in the deformation range of the lift body structure, each adjusting body 7 has a curved conical shape whose local cross-section corresponds to the profile thickness at the respective point; and each adjusting body 7, at least in areas, by means of a line contact is in a direct contact and/or by way of at least one thin friction-reducing layer 11 is in an indirect contact with the skin 3, 4 of the lift body.

The invention is based on implementing via an integrated adjusting device in a lift body a variable and continuous camber change with a smooth, constant profile contour without bends. The adjusting device has at least one essentially single-section adjusting body. Preferably, several adjusting bodies are arranged in parallel with respect to one another. A camber change of the top side as well as of the bottom side of the profile along the chord in the negative direction (negative camber) as well as in the positive direction (positive camber) between a fixed spar and the wing end edge or also the front edge is permitted as a result of this integrated adjusting device. It is a special advantage that also an adjustment differentiated with respect to the span width can be implemented for the positive camber and the negative camber.

The previously existing problem of adapting the contour, for example, of an airplane wing, which is constructed in the known rigid rib construction, to a flow profile is addressed by the present invention without the occurrence of bends, cracks or gaps in the profile of the skin. The flow characteristics of the lift body are therefore considerably improved.

It is another advantage of the invention that the geometrical moment of inertia of the arrangement according to the invention is significantly larger than the geometrical moment of inertia of arrangements known from the state of the art. High stiffness requirements can be met without having to tolerate a large increase in weight. It is particularly advantageous that, because of the large geometrical moment of inertia, the adjusting body need not be constructed of a massive material, particularly of metal, but hollow bodies and preferably light-weight materials can be used, particularly preferably fiber-reinforced materials. This minimizes the weight increase of an airplane wing which is equipped with the adjusting device according to the invention.

The continuous camber change without buckling in the skin is particularly protective of the material and prevents a premature material fatigue. The pressure-side and the suction-side skin is connected with the rigid forward part preferably via a threaded connection. The other skin side is not supported or can be provided with a linear bearing. This provides the skin structure with a flexibility which protects the material, and reduces the deformation forces.

The bearing of the adjusting body, particularly in the rigid forward part of the lift body, permits a variation of the camber of the lift body also in the case of aerodynamic stress.

It is advantageous to cause the rotation of the adjusting body via a linear drive which is applied to the adjusting body in a point-type manner. Also under an aerodynamic load, the course of the moments for the adjusting body has the result that, despite changing angular positions, the actuator must always apply approximately the same tensile force which, in addition, is relatively low because of the transmission ratio of the arrangement.

It is particularly advantageous that the lift body can be constructed in a simple and maintenance-friendly manner. The skin can easily be removed, and the adjusting device is freely accessible.

Other objects, advantages and novel features of the present invention will become apparent from the following detailed description of the invention when considered in conjunction with the accompanying drawings.

BRIEF DESCRIPTION OF THE DRAWINGS

FIG. 1 is a sectional view of a lift body in several camber conditions according to a preferred embodiment of the present invention;

FIG. 2 is a sectional view in the area of an adjusting body;

FIG. 3 is a top view of the opened overall system;

FIG. 4 is a view of the adjusting kinematics with the linear reactor;

FIG. 5 is an enlarged partial sectional view corresponding to FIG. 1 with an undeformed and a deformed condition of the lift body;

FIG. 6 is a perspective view of a hollow adjusting body;

FIG. 7 are two longitudinal sectional views of a lift body in the area of the actuators.

DETAILED DESCRIPTION OF THE DRAWINGS

Figure 8:
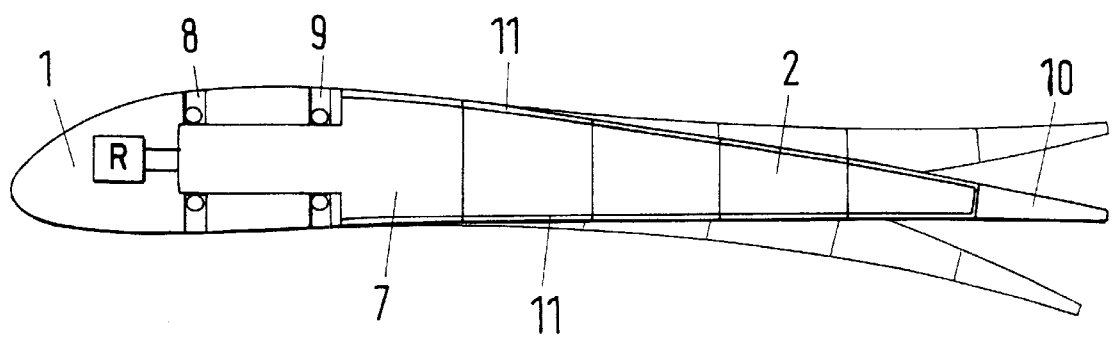
FIG. 8 is a sectional view of a lift body with a rotatory drive.

FIG. 1 is a sectional view of a lift body, such as an airplane wing, with a rigid forward part 1 and a flexible rearward part with a structural end edge part 10. The lift body is surrounded by a skin which is flexible at least in the given movement ranges, particularly a fiber composite material, the upper skin 3 representing the suction side and the lower skin 4 representing the pressure side of the lift body. In the interior, the suction side and the pressure side of the flexible rearward area are connected with a number of webs 5 which extend in parallel with respect to one another and which are preferably arranged in parallel to the longitudinal dimension of the lift body. In the neutral position of the adjusting device, the skin assumes a profile 2. The maximal deflections of this profile are marked by positions 2' and 2".

The adjusting device, which is not visible in the illustrated cutting plane, is arranged between the webs 5. The webs 5 are recessed with respect to the span width in the movement ranges of the adjusting body 7.

The webs are preferably flexible and formed of a fiber composite material, particularly of an aramide fiber composite material and/or a glass fiber composite material and/or a carbon fiber composite material.

The skin is interrupted on the suction side or, as illustrated, on the pressure side. The interrupted side of the skin is freely movable or, as illustrated, is connected by way of a linear bearing 6 with the rigid forward part 1 of the lift body. This ensures the required flexibility of the skin also in the case of a considerable camber. Due to the arrangement of the linear bearing, the displacement of the skin 4 on the pressure side with respect to the suction side skin 3 is the largest on the rigid forward part 1. Since there the webs 5 arranged in the interior are the longest, their edge fiber expansions remain in the permissible reversible range.

FIG. 2 is a sectional view of the adjusting device which is integrated in the flexible area of the lift body. The adjusting device has at least one essentially rigid, conically curved adjusting body 7 which is rotatably disposed on one or several spar webs 8, 9 in the rigid forward part 1 of the lift body. At least in sections, the adjusting body 7 rests along its longitudinal dimension indirectly on the interior side of the skin 3 and/or 4. A rotation of the curved adjusting body 7 has the effect that the flexible skin deforms in the area of the adjusting body. The profile of the skin 3, 4 adapts to the smooth continuous profile of the adjusting body 7. The deformation can take place as a positive camber as well as a negative camber. In the described arrangement, it is not circular but partially deviates considerably from the circular shape. Because of the relative movement of the adjusting body with respect to the skin structure, the vertical space is limited toward the extreme positions.

The intensity of the achievable camber depends on the intensity of the curvature of the adjusting body 7. The contact surface between the skin 3, 4 and the adjusting body 7 is preferably provided with a sliding layer 11 which is arranged on the adjusting body surface and/or on the interior side of the skin. The sliding layer preferably consists of a plastic material, such as teflon, and/or a solid lubricant and/or a metal layer. As a result, a rotational and/or sliding movement of the adjusting body 7 on the interior side of the skin 3, 4 is facilitated not only in the unloaded condition but also in the case of aerodynamic stress. In addition, the sliding layer 11 permits a linear uniform force transmission between the skin 3, 4 and the adjusting body 7.

The adjusting device preferably has several adjusting bodies 7 which are arranged in parallel to one another. In a preferred embodiment, the adjusting body 7 is formed as a hollow body of a fiber composite material, particularly of a carbon fiber composite material, a glass fiber composite material and/or and aramide fiber composite material.

The arrangement of the bearing B of the adjusting body 7 in the rigid forward part 1 of the lift body is particularly advantageous. It permits a simple and maintenance-friendly construction of the lift body. The skin is preferably simply screwed to the rigid forward part 1 and, for maintenance purposes, can, for example, simply be removed toward the rear by the opening-up of the screwed connection on the suction side.

It is very advantageous to manufacture the skin also of a fiber composite material It may also be advantageous to design the suction side of the skin structure to be freely movable on the forward edge. The resulting gap will optionally be covered by a spoiler existing there.

FIG. 3 is a top view of the opened overall system. The rigid forward part 1 is illustrated in which several adjusting bodies 7 are disposed in a rotatable manner. The recesses of the webs 5 provided with respect to the span width for the swivel range of the adjusting bodies 7 are illustrated.

The curvature of the adjusting bodies 7 has the effect that a rotation of these adjusting bodies 7 causes not only a vertical lift but also a horizontal displacement so that, in addition, the webs 5 must be recessed in the swivel range of the adjusting bodies 7.

The rotating of the adjusting bodies 7 forces the skin to assume a shape which, on the lateral surface of the adjusting body 7 corresponds to the respective boundary line of a vertical cut along the center line of the adjusting body. Thus, by way of the angle of rotation of the adjusting bodies 7, profiles can continuously be adjusted which represent a linear combination of the extreme position (maximal positive or negative camber) and the neutral position.

The overall structure consists of a bendable skin body with a suction-side skin 3 on the top side and a pressure-side skin 4 on the bottom side;

one or several webs which are shear-resistant in the direction of the y-axis (span width direction) but bendable in the direction of the x-axis (flying direction) and which connect the suction-side skin 3 and the pressure-side skin 4 with one another;

a linear bearing 6 which permits that the pressure-side skin 4 carries out a linear displacement relative to the spar web 9; the suction-side skin 3 is fixedly connected with the spar web 9;

a fixed spar or spar web 8, 9;

a structural end edge part 10;

one or several horn-shaped adjusting bodies 7 which are rotatably disposed on the spar web 8, 9;

a sliding layer 11 which brings the interior side of the pressure-side skin 4 in contact with the adjusting body 7.

The rotating movement of the adjusting body 7 is advantageously generated by a linear drive. This is illustrated in FIG. 4. The pertaining linear actuator 12 is radially linked to the adjusting body 7 and is rotatably disposed so that, during an adjusting cycle, it carries out a swivel movement. The arrangement of the linear actuator 12 and the course of the moments occurring as a result of the construction at the frustum of the adjusting body under an aerodynamic load has the result that the linear actuator 12, which causes the rotating movement, despite different angular positions, must always apply approximately the same tensile force. Because of the "natural" transmission ratio of the adjusting device, the tensile force is relatively low. FIG. 4 shows the movement of the linear actuator 12 during the rotation of the adjusting body 7 and a view of the operative torque $M_H$ and lever $L_H$ as well as the tensile force $F_A$.

Another advantageous embodiment would be the use of a rotatory drive R for rotating the adjusting body 7.

By means of an individual control of the individual adjusting bodies 7, a camber can be implemented which is differentiated with respect to the span width. The control can take place mechanically, electrically, pneumatically and/or hydraulically.

FIG. 5 illustrates the deformation conditions already shown in FIG. 1. In this case, an undeformed and a downwardly cambered condition (reference number provided with two prime marks) of the lift body are indicated. The deformation of the webs 5 is indicated as well as the relatively significant deformation or displacement in the area of the linear bearing 6.

FIG. 6 is a perspective view of a hollow adjusting body 7, in which case the area which is curved in the manner of a horn as well as the tapered cylindrical bearing area are visible.

FIGS. 7 shows two sectional views of a lift body whose adjusting kinematics permit a profile camber which is differentiated with respect to the span width. For this purpose, the adjusting bodies 7 (in this case, there are, for example, four) are coupled by way of elastic rods 13 so that each adjusting body 7 may have a different angle of rotation. In this case, two linear actuators 12 are sufficient which can be adjusted in the same direction and in opposite directions as well as by the same and by different paths, that is, independently of one another.

The lower representation shows that the lift body is cambered in the upward direction on the left and in the downward direction on the right, the linear actuators 12 tensioning the elastic rods 13 by of an adjustment in opposite directions and therefore stretching them. Naturally, a differentiated deformation with respect to the span width in the same direction (downward or upward) and a deformation which is constant along the span width is also possible, the elasticity of the rods 13 not having an effect in the latter case.

Thus, a plurality of dimensional changes can be carried out at low constructive expenditures.

It should again be pointed out explicitly that the invention is suitable to the same extent for the trailing edge and for the leading edge of lift bodies, such as airplane wings, for the purpose of adjusting them.

The construction is easy to implement because it is similar to the known rib construction so that experiences can be used from this area.

While the above statements concentrated on wing profiles, the invention is not limited to this application. Additional ranges of application of the invention are those areas where a profile has contact with a flow medium, such as fuselage parts of airplanes, hulls of boats, rotor blades, etc. The term "lift body" should not be understood to mean that only vertical forces can be generated. The invention can also be used, for example, in the case of "lateral drive bodies", such as ship rudders, rudder units, etc.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Lift body having a variable camber, comprising:
   a lift body structure including a suction-side skin and pressure-side skin forming a fluidically favorable profile which at least at times generates a lift or a transverse driving force, said lift body structure being substantially hollow, said lift body structure being elastically deformable at least downstream of a largest profile thickness thereof,
   several web-type connections between the suction-side skin and the pressure-side skin,
   an integrated adjusting device comprising at least one dimensionally stable adjusting body which is rotatable about a defined axis and is coupled with areas of the skin to be deformed,
   wherein in a deformation range of the lift body structure, each adjusting body has a curved conical shape with a cross-section corresponding to a thickness of the lift body structure; and
   wherein, during all operating positions of the lift body, at least a portion of each adjusting body is in direct linear contact with the skin of the lift body whereby each adjusting body continuously supports the skin of the lift body during all operating positions of the lift body.

2. Lift body according to claim 1, wherein at least a portion of each adjusting body is in direct linear contact with both the suction-side skin and the pressure-side skin during all operating positions of the lifting body.

3. Lift body according to claim 2, wherein each of the at least one adjusting bodies is rotatable about a respective virtual axis by a linear drive.

4. Lift body according to claim 3, wherein the linear drive is linked essentially radially to a respective adjusting body.

5. Lift body according to claim 2, wherein at least one side of the skin is freely movable in a transition area with respect to the rigid forward part of the body or via at least one linear bearing is connected with the rigid forward part of the lift body.

6. Lift body according to claim 2, wherein each adjusting body is constructed as a hollow body.

7. Lift body according to claim 2, wherein each adjusting body is made of at least one of a fiber composite material, a glass fiber composite material, and an aramide fiber composite material.

8. Lift body according to claim 1, wherein each of the at least one adjusting bodies is rotatably disposed in a respective bearing arranged on a rigid forward part of the lift body.

9. Lift body according to claim 8, wherein at least one side of the skin is freely movable in a transition area with respect to the rigid forward part of the body or via at least one linear bearing is connected with the rigid forward part of the lift body.

10. Lift body according to claim 9, wherein each adjusting body is constructed as a hollow body.

11. Lift body according to claim 8, wherein each of the at least one adjusting bodies is rotatably disposed in a respective bearing arranged on a rigid forward part of the lift body.

12. Lift body according to claim 11, wherein each of the at least one adjusting bodies is rotatable about a respective virtual axis by a linear drive.

13. Lift body according to claim 1, wherein each of the at least one adjusting bodies is rotatable about a respective virtual axis by a linear drive.

14. Lift body according to claim 13, wherein the linear drive is linked essentially radially to a respective adjusting body.

15. Lift body according to claim 14, wherein at least one side of the skin is freely movable in a transition area with respect to the rigid forward part of the body or via at least one linear bearing is connected with the rigid forward part of the lift body.

16. Lift body according to claim 1, wherein each adjusting body is constructed as a hollow body.

17. Lift body according to claim 1, wherein each adjusting body is made of at least one of a fiber composite material, a glass fiber composite material, and an aramide fiber composite material.

18. Lift body according to claim 17, wherein each adjusting body is made of a carbon fiber composite material.

19. Lift body according to claim 1, wherein said web-type connections are arranged in parallel to a longitudinal dimension of the lift body, and wherein the web connections are made of at least one of a fiber composite material, a glass fiber composite material, and an aramide fiber composite material.

20. Lift body according to claim 19, wherein said web-type connections are made of a carbon fiber composite material.

21. Lift body according to claim 19, wherein said web-type connections are arranged in parallel to a longitudinal dimension of the lift body, and wherein the web connections are made of at least one of a fiber composite material, a glass fiber composite material, and an aramide fiber composite material.

22. Lift body according to claim 21, wherein said at least one adjusting body includes at least three adjusting bodies,
   wherein the adjusting bodies are kinematically coupled via an elastic rod applied outside their axes of rotation, and
   wherein respective first and second linear actuators are applied to each of the adjusting bodies and located on respective first and second ends of the respective adjusting bodies, the first and second linear actuators being adjustable independently of one another.

23. Lift body according to claim 1, wherein at least a portion of the skin is removable from the lift body.

24. Lift body according to claim 1, wherein the lift body is adapted for use in at least one of an aircraft, a land vehicle, and a watercraft.

25. Lift body according to claim 1, wherein said at least one adjusting body includes at least three adjusting bodies,
   wherein the adjusting bodies are kinematically coupled via an elastic rod applied outside their axes of rotation, and
   wherein respective first and second linear actuators are applied to each of the adjusting bodies and located on respective first and second ends of the respective adjusting bodies, the first and second linear actuators being adjustable independently of one another.

26. Lift body according to claim 1, wherein said lift body is an airplane wing.

27. Lift body according to claim 1, wherein said at least one adjusting body includes a plurality of adjusting bodies arranged side by side in the lift body structure.

28. Lift body according to claim 27, wherein each of the at least one adjusting bodies is rotatably disposed in a respective bearing arranged on a rigid forward part of the lift body.

29. Lift body according to claim 28, wherein at least one side of the skin is freely movable in a transition area with respect to the rigid forward part of the body or via at least one linear bearing is connected with the rigid forward part of the lift body.

30. Lift body according to claim 29, wherein each adjusting body is constructed as a hollow body.

31. Lift body having a variable camber, comprising:
   a lift body structure including a suction-side skin and a pressure-side skin forming a fluidically favorable profile which at least at times generates a lift or a transverse driving force, said lift body structure being substantially hollow, said lift body structure being elastically deformable at least downstream of a largest profile thickness thereof,
   several web-type connections between the suction-side skin and the pressure-side skin,
   an integrated adjusting device comprising at least one dimensionally stable adjusting body which is rotatable about a defined axis and is coupled with areas of the skin to be deformed,
   wherein in a deformation range of the lift body structure, each adjusting body has a curved conical shape with a cross-section corresponding to a thickness of the lift body structure; and
   wherein, during all operating positions of the lift body, at least a portion of each adjusting body is in indirect contact with the skin of the lift body via at least one thin friction-reducing sliding layer whereby each adjusting body continuously supports the skin of the lift body during all operating positions of the lift body.

32. Lift body according to claim 31, wherein at least a portion of each adjusting body is in indirect linear contact with both the suction-side skin and the pressure-side skin during all operating positions of the lifting body.

33. Lift body according to claim 32, wherein each of the at least one adjusting bodies is rotatably disposed in a respective bearing arranged on a rigid forward part of the lift body.

34. Lift body according to claim 33, wherein each of the at least one adjusting bodies is rotatable about a respective virtual axis by a linear drive.

35. Lift body according to claim 32, wherein each of the at least one adjusting bodies is rotatable about a respective virtual axis by a linear drive.

36. Lift body according to claim 35, wherein the linear drive is linked essentially radially to a respective adjusting body.

37. Lift body according to claim 32, wherein at least one side of the skin is freely movable in a transition area with respect to the rigid forward part of the body or via at least one linear bearing is connected with the rigid forward part of the lift body.

38. Lift body according to claim 32, wherein each adjusting body is constructed as a hollow body.

39. Lift body according to claim 32, wherein each adjusting body is made of at least one of a fiber composite material, a glass fiber composite material, and an aramide fiber composite material.

40. Lift body according to claim 39, wherein said web-type connections are arranged in parallel to a longitudinal dimension of the lift body, and wherein the web connections are made of at least one of a fiber composite material, a glass fiber composite material, and an aramide fiber composite material.

41. Lift body according to claim 40, wherein said at least one adjusting body includes at least three adjusting bodies,
   wherein the adjusting bodies are kinematically coupled via an elastic rod applied outside their axes of rotation, and
   wherein respective first and second linear actuators are applied to each of the adjusting bodies and located on respective first and second ends of the respective adjusting bodies, the first and second linear actuators being adjustable independently of one another.

42. Lift body according to claim 31, wherein each of the at least one adjusting bodies is rotatable about a respective virtual axis by a linear drive.

43. Lift body according to claim 42, wherein the linear drive is linked essentially radially to a respective adjusting body.

44. Lift body according to claim 43, wherein at least one side of the skin is freely movable in a transition area with respect to the rigid forward part of the body or via at least one linear bearing is connected with the rigid forward part of the lift body.

45. Lift body according to claim 31, wherein each adjusting body is constructed as a hollow body.

46. Lift body according to claim 31, wherein each adjusting body is made of at least one of a fiber composite material, a glass fiber composite material, and an aramide fiber composite material.

47. Lift body according to claim 46, wherein each adjusting body is made of a carbon fiber composite material.

48. Lift body according to claim 31, wherein said web-type connections are arranged in parallel to a longitudinal dimension of the lift body, and wherein the web connections are made of at least one of a fiber composite material, a glass fiber composite material, and an aramide fiber composite material.

49. Lift body according to claim 48, wherein said web-type connections are made of a carbon fiber composite material.

50. Lift body according to claim 31, wherein at least a portion of the skin is removable from the lift body.

51. Lift body according to claim 31, wherein the lift body is adapted for use in at least one of an aircraft, a land vehicle, and a watercraft.

52. Lift body according to claim 31, wherein said at least one adjusting body includes at least three adjusting bodies,
   wherein the adjusting bodies are kinematically coupled via an elastic rod applied outside their axes of rotation, and
   wherein respective first and second linear actuators are applied to each of the adjusting bodies and located on respective first and second ends of the respective adjusting bodies, the first and second linear actuators being adjustable independently of one another.

53. Lift body according to claim 31, wherein said lift body is an airplane wing.

54. Lift body according to claim 31, wherein the thin friction-reducing layer is provided on the at least one adjusting body.

55. Lift body according to claim 31, wherein said at least one adjusting body includes a plurality of adjusting bodies arranged side by side in the lift body structure.

* * * * *